May 25, 1971  E. A. FRANK  3,579,670
PIPE CONNECTOR
Filed July 2, 1968  4 Sheets-Sheet 1
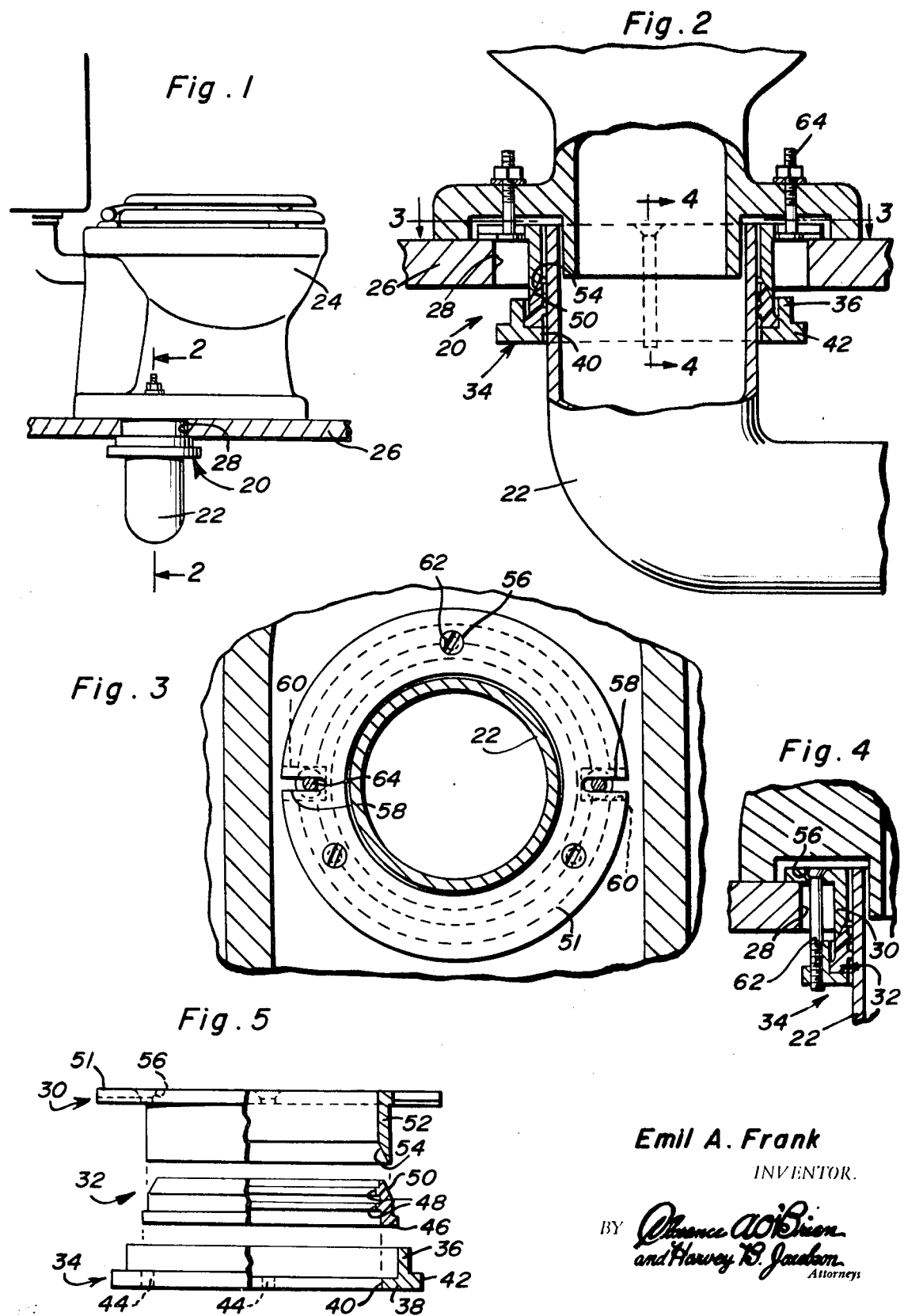
Emil A. Frank
INVENTOR.
BY Clarence A. O'Brien
and Harvey B. Jacobson
Attorneys

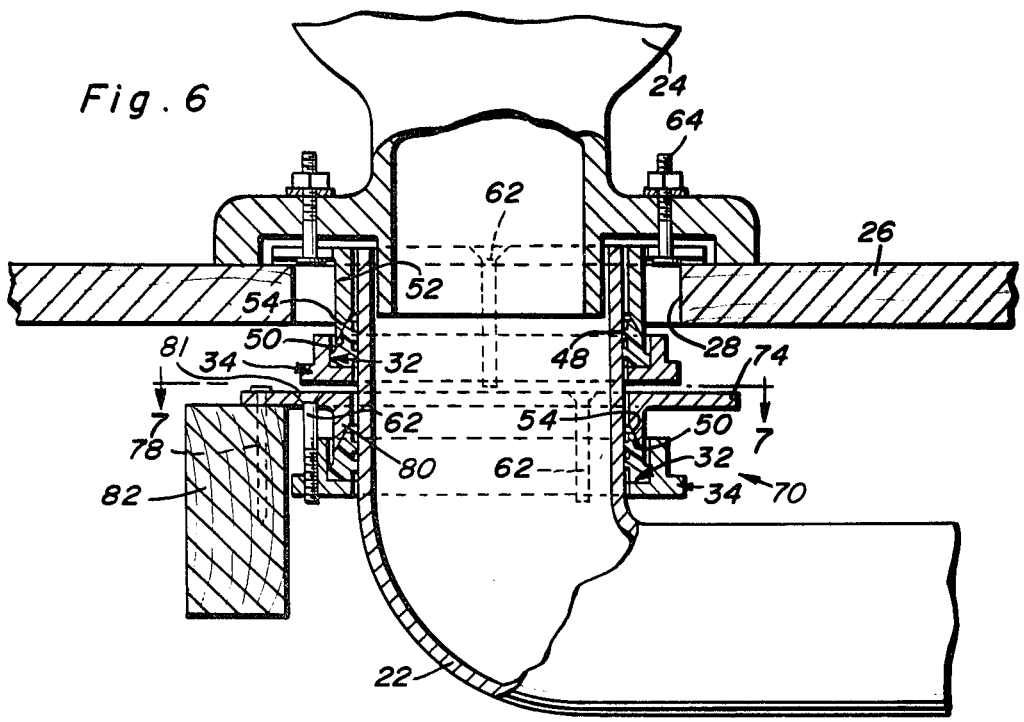
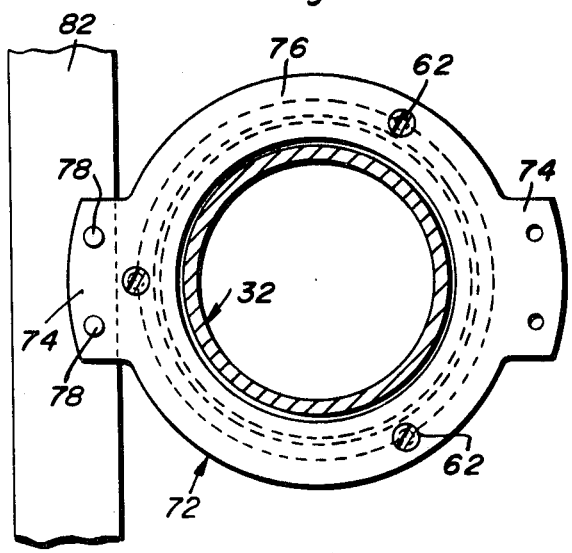
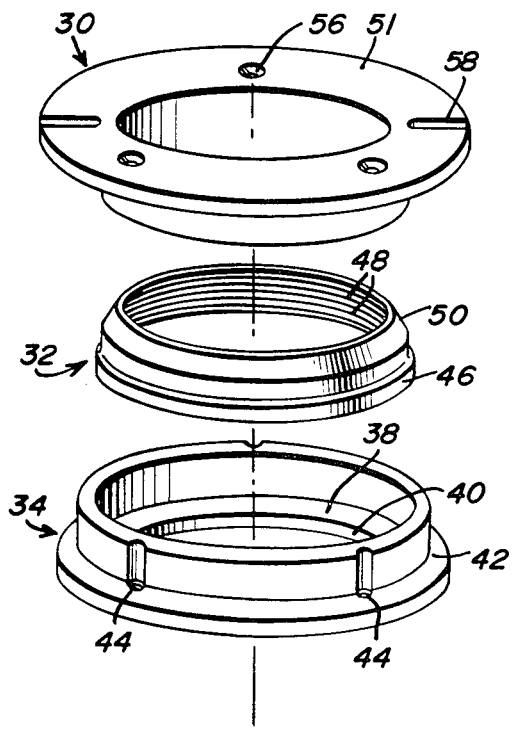
Emil A. Frank
INVENTOR.

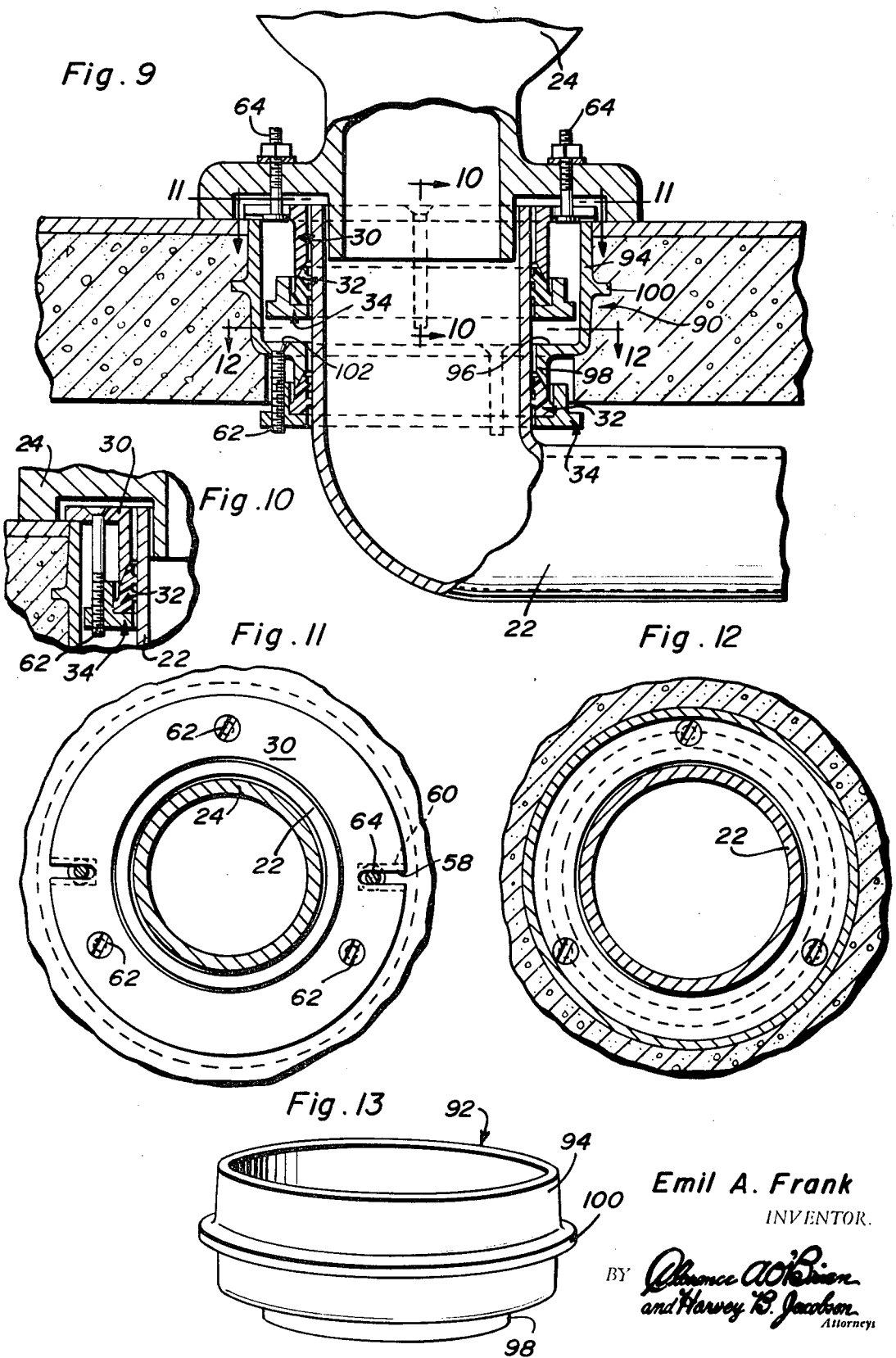

Emil A. Frank
INVENTOR

United States Patent Office 3,579,670
Patented May 25, 1971

3,579,670
PIPE CONNECTOR
Emil A. Frank, Long Beach, Calif., assignor of fractional part interest to Ronald L. Frank, Long Beach, Calif.
Filed July 2, 1968, Ser. No. 742,040
Int. Cl. F16l 37/04
U.S. Cl. 4—252          8 Claims

ABSTRACT OF THE DISCLOSURE

A device for connecting pipes together, connecting a pipe to a water closet or supporting a closet bend pipe which utilizes a collar squeezing a resilient gasket against the pipe to provide a water-tight, mechanical seal without the problems usually associated with the normal hot lead type of sealant.

---

The present invention relates to a mechanical, water-tight seal to be used on relatively large diameter pipes. The sealing mechanism utilizes a resilient gasket that encircles the pipe and is squeezed, causing it to expand against and sealingly grip the pipe. This creates a mechanical water-tight seal. Heretofore, when dealing with such pipes the common sealant used was molten lead as in the Bell hub and spigot type joint. This is a time-consuming operation that is relatively dangerous and requires a good deal of skill. Also, when the pipes to be sealed extend horizontally, molds are required to effect the lead seal. Further, a lead seal does not withstand shock or a force tending to move the pipes, that are so connected, relative to one another. Whereas the present invention, because of its resilient mechanical seal, can absorb shock without amplifying it or transmitting it through the entire pipe system and can also withstand any relative misalignment between the pipes.

The instant invention is also superior to the presently available connectors which do not use lead as the sealant. The Bell hub and spigot joint with neoprene gaskets requires a pressure and lever tool and the installation thereby achieved is not as dependable nor as easily accomplished. The no hub connector which uses rubber rings and a strap clasp is not as strong a connector as the instant invention nor is it as versatile in its application to all plumbing situations.

It is therefore an object of this invention to provide a simple easy-to-install pipe connector.

A further object of this invention is to provide a pipe connector that mechanically seals and renders the connection watertight.

A further object of the invention is to provide a pipe connector that can withstand misalignment after installation.

A still further object of this invention is to provide a pipe connector that can withstand shock and not transmit it.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevation view showing the invention connecting a pipe to a water closet.

FIG. 2 is an enlarged section view taken substantially along the line 2—2 of FIG. 1.

FIG. 3 is an enlarged section view taken substantially along the line 3—3 of FIG. 2.

FIG. 4 is an enlarged section view taken substantially along the line 4—4 of FIG. 2.

FIG. 5 is an exploded side view, partially in section, of the connector components.

FIG. 6 is a side view, partially in section, of another form of the invention utilizing a modified form of the connector as a support for the pipe.

FIG. 7 is a section view taken substantially along the line 7—7 of FIG. 6.

FIG. 8 is an exploded perspective view of the components of the basic connector.

FIG. 9 is a side view, partially in section, of the connector in a form adapted for use in concrete installations.

FIG. 10 is a sectional detail taken substantially along the line 10—10 of FIG. 9.

FIG. 11 is a sectional view taken substantially along the line 11—11 of FIG. 9.

FIG. 12 is a sectional view taken substantially along the line 12—12 of FIG. 9.

FIG. 13 is a perspective view of the component adapting the connector for use in concrete installations.

Figure 14:
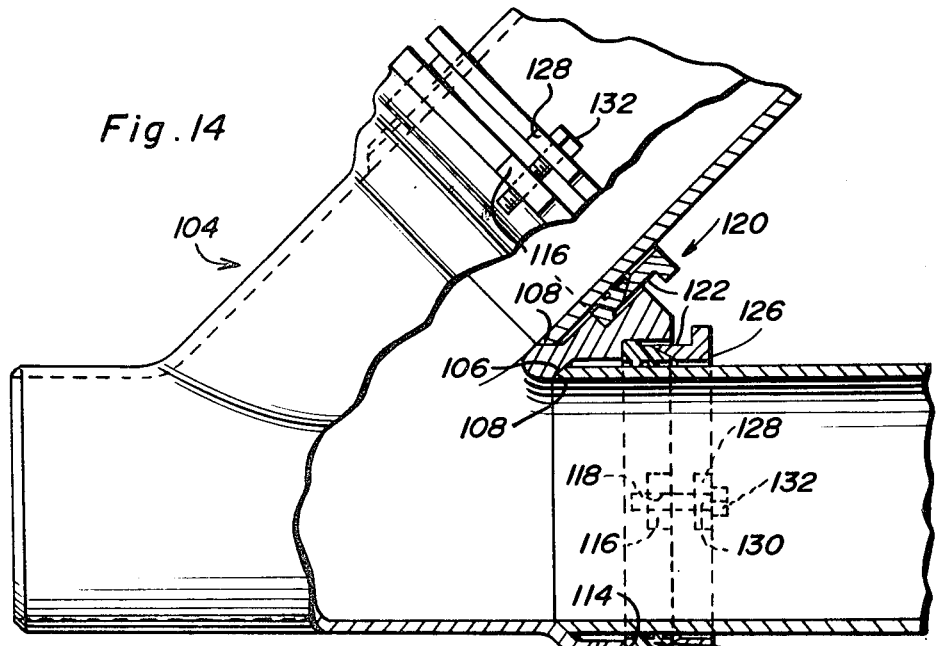
FIG. 14 shows another form of the connector adapted for incorporation in standard plumbing fittings.
Figure 15:
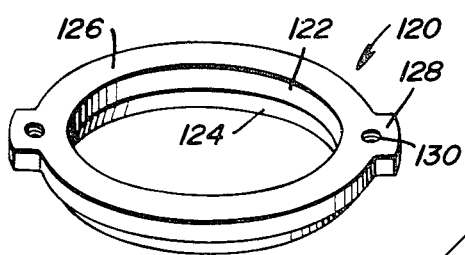
FIG. 15 is a perspective view of the pressure ring used in a device of FIG. 14.
Figure 16:
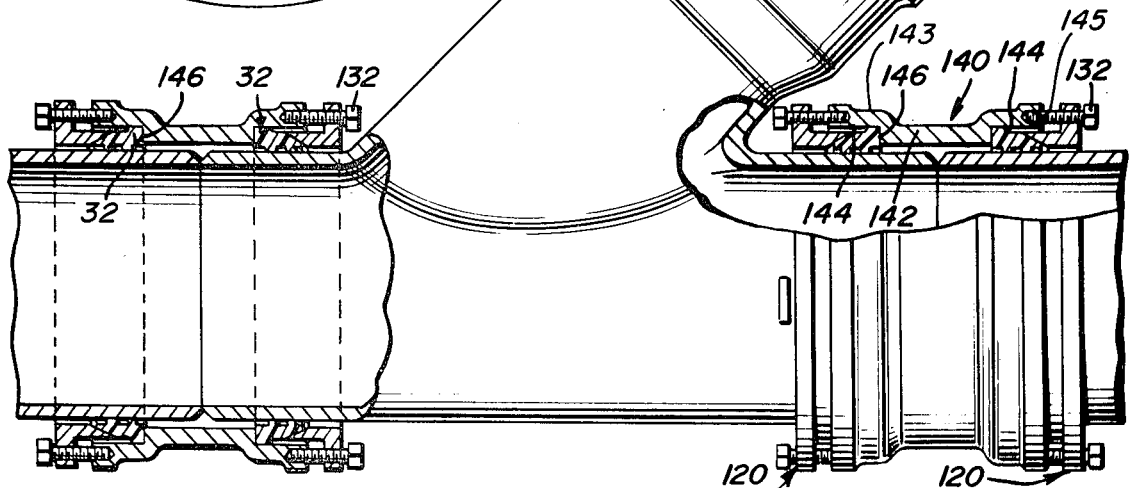
FIG. 16 is a view similar to FIG. 14 showing the connector adapted to another standard plumbing fitting.

Referring now to the drawing, the pipe connector assembly is generally designated by the reference numeral 20 which, in FIGS. 1 through 5, is shown as part of a water closet connector wherein a closet pipe 22 is connected to a water closet 24. A floor 26 is shown with a hole 28 therethrough for mounting and support of the pipe 22 for the closet 24. The connector assembly 20 has three major components: a mounting ring 30, a resilient gasket 32, and a pressure ring 34. The pressure ring 34 has a vertically extending portion 36 with an inwardly directed flange 38 whose inner diameter 40 is slightly larger than the pipe on which it is to be installed. The ring 34 has an outwardly extending flange 42 with threaded openings 44 therethrough.

The resilient gasket 32 has a base portion 46 whose outside diameter is substantially the same as the inside diameter of portion 36 of ring 34. Similarly, the inside diameter of the gasket 32 is substantially the same as the inner diameter 40 of flange 38. The surface of the inner diameter of gasket 32 has annular ridges 48 thereon, whose inner diameters are sized to fit around a pipe 22. The upper end of gasket 32 is beveled at 50, with the angular side of the bevel facing outwardly for reasons to be set forth hereinafter. The gasket 32 is set into the pressure ring 34 and seated on flange 38 thereof for the insertion of the assembled units 32 and 34 on pipe 22.

Mounting flange 30 has a rim 51 that is larger than the opening 28 and is installed thereover with its depending cylindrical portion 52 extending through the hole toward the ring 34 and gasket 32. The inside diameter of the cylindrical portion 52 is substantially the same as the inner diameter of gasket 32 and opening 40 in ring 34 thereby leaving annular ridges 48 as the only inward protrusion on the inner surfaces of the three components when aligned for installation. The lower edge of portion 52 has a bevel 54 with the angular face thereof facing inwardly towards the pipe 22. The angle of the bevel 54 is complementary to the angle of bevel 50 on the gasket 32 so that when the three elements 30, 32 and 34 are assembled as shown in FIGS. 2 and 4 the bevels will coincide and exert a uniform inward pressure on the gasket. The rim 51 has countersunk holes 56 spaced around the circumference portion 52 to coincide with the threaded openings 44 in ring 34. The rim 51 also has U shaped notches 58 extending radially inward from the circumference thereof which are relieved on the underside As demonstrated above the simple but unique mechanical pipe connector set forth herein lends itself to most any installation whether new construction or a repair. Due to its adaptability to most any situation a relatively small inventory of parts need be maintained to use on pipe installations of the type set forth hereinbefore. The time saved in their installation can effect great savings as well as trouble-free installations due to their ability to absorb shock and misalignment without breaking the watertight seal.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

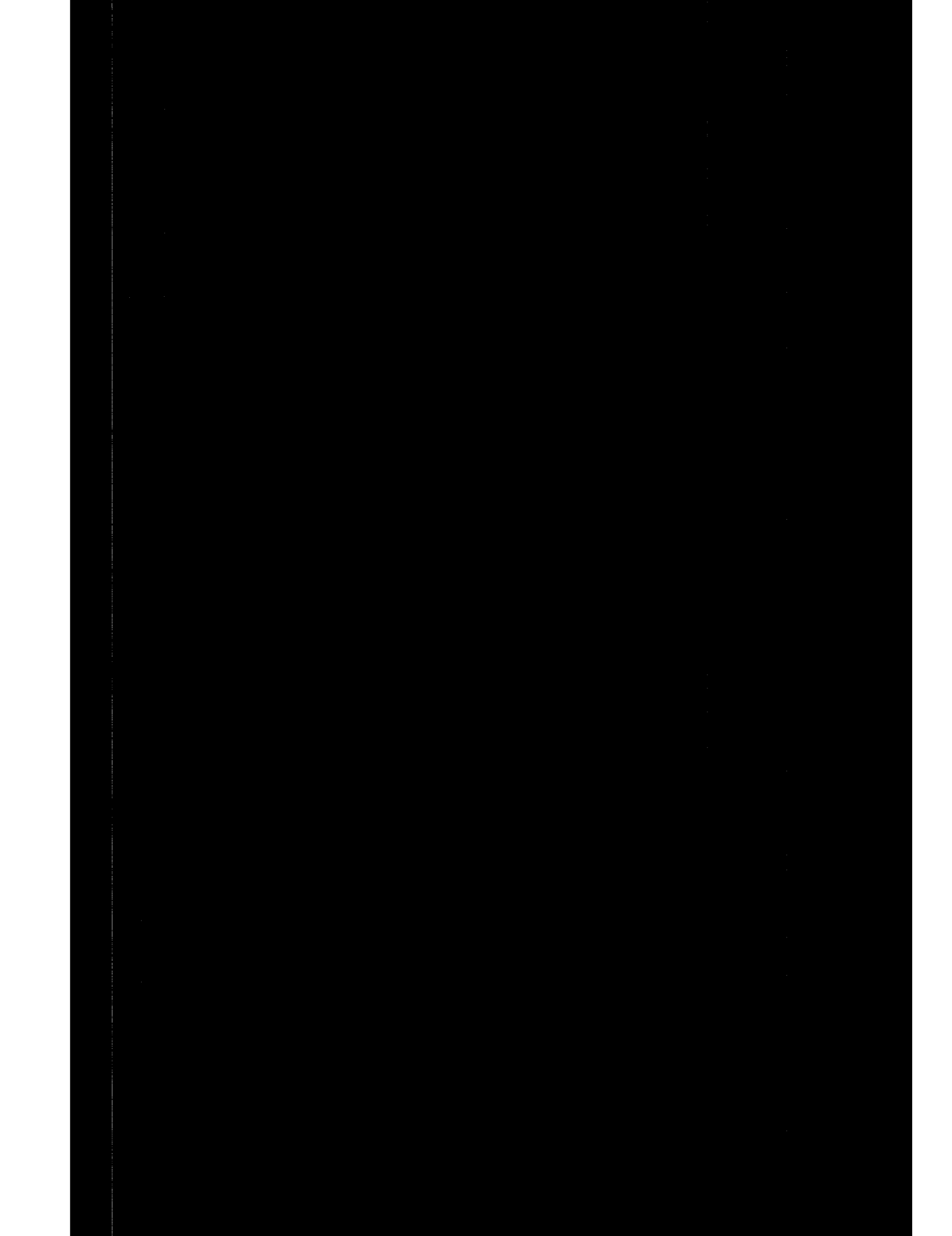

What is claimed as new is as follows:

1. A pipe connector for engaging, sealing and supporting a generally smooth surfaced pipe and attaching a water closet thereto, said connector comprising a mounting member, a resilient gasket, and a pressure member, each of said members and said gasket being slidably receivable over the pipe with the gasket orientated between the two members, means operatively connecting said mounting member and said pressure member for nonrotatable sliding movement of the pressure member longitudinally along the pipe to compress the gasket between the pressure member and the mounting member, and means on the mounting member cooperating with means on said gasket to cause the gasket to expand inwardly of the mounting member and pressure member upon a compression of the gasket between the members to clampingly and sealingly engage the pipe, each of said members and said gasket being cylindrical and including opposed ends, said pressure member including an internal diameter greater than the external diameter of the gasket and telescopically receiving said gasket, said pressure member engaging the outer surface of said gasket so as to preclude an outward expansion thereof and including an inwardly directed flange on one end therof for a seating thereagainst of one end of the gasket, the second end of the pressure member opening toward the mounting member for enabling an engagement of the second end of the gasket with the inner end of the mounting member, the cooperating means between the mounting member and the gasket comprising a beveled outer surface on the end of the gasket and a complementary bevel on the inner surface of the inner end of the mounting member, said beveled surface engaging each other and, upon a longitudinal movement of the gasket and mounting member toward each other, effecting an inward pressing of the gasket aginst the pipe, said mounting member having a radially extending flange about the outer end thereof remote from the gasket, said flange being adapted to engage a floor to support the mounting member and pipe connector therefrom, said radially extending flange having upwardly directed means thereon adapted to attach a water closet thereto, a second mounting member positionable about the pipe in longitudinally spaced relation below the first mounting member, and a second pressure member associated with said second mounting member, said second pressure member and second mounting member receiving a second resilient gasket therebetween for a selective compressing and inward expanding thereof into engagement with the pipe, said second mounting member including an outwardly extending portion at the upper end thereof adapted to engage supporting structure for stabilization of the pipe thereto independent of the floor engageable by the first mentioned mounting member.

2. A device for mounting and interconnecting a water closet and closet bend pipe within a concrete floor, an enlarged housing independent of and positionable in surrounding relation about the upper end of a closet bend pipe, said housing, for the major portion of the height thereof downward from the upper end, being of a substantially greater diameter than the pipe so as to define an enlarged space thereabout, said housing including means for an anchoring thereof to a concrete floor, the lower portion of said housing including an inwardly directed peripheral flange terminating in a depending cylindrical portion slidably receivable about the pipe closely adjacent thereto, a gasket slidably positionable about the pipe and engaged with the lower edge portion of the housing, a pressure member positionable about the pipe below the gasket, and means engaged between the housing flange and the pressure member for selectively drawing the pressure member upward so as to compress the gasket and effect an inward expansion thereof against the pipe.

3. The device of claim 2 wherein said pressure member defines an upwardly directed seat engaged with the lower edge of said gasket and the outer surface thereof adjacent the lower edge so as to resist any tendency for outward expansion of the gasket upon a compression thereof.

4. The device of claim 2 including a mounting member positioned within the housing through the upper end thereof, said mounting member including an upper end having a laterally directed flange thereon overlying the upper end of the housing, a second gasket engaged with the lower end of the mounting member, a second pressure member slidably received within the upper portion of the housing and engaged against the lower portion of the second gasket, and means engaged between the mounting member and the second pressure member for effecting an upward movement of the second pressure member for compression and inward expansion of the second gasket against the pipe, said mounting member including upwardly directed means on the flange thereof for the mounting of a superimposed water closet.

5. For use in combination with a floor supported water closet and subjacent water bend pipe therefor, an independent device for mounting and interconnecting the closet and pipe comprising a cylindrical mounting member slidably positionable in surrounding relation about the upper end of the pipe, said mounting member including an outwardly directed flange about the upper end thereof, said flange being engageable with the floor receiving the water closet and including means for releasably locking a closet bowl thereto, a cylindrical gasket slidably positionable in surrounding relation about said pipe and engaged with the lower end of the mounting member, a cylindrical pressure member slidably positionable in surrounding relation about said pipe and engaged with the lower end of said gasket, said pressure member and the lower portion of said mounting member being so configured as to, upon an upward movement of the pressure member relative to the mounting member, compress the gasket and effect the inward expansion thereof into sealed engagement against said pipe and means engaged between the mounting member and the pressure member for effecting a longitudinal upward movement of the pressure member toward the mounting member for a compression of said gasket.

6. The device of claim 5 wherein the means for moving the pressure member toward the mounting member comprises a plurality of elongated screws rotatably received through the mounting member and threadedly engaged with the pressure member whereby upon rotation of said screws a vertical movement of the pressure member is effected.

7. The device of claim 5 wherein said pressure member includes an internal diameter greater than the external diameter of the gasket and telescopically receives said gasket, said pressure member engaging the outer surface of said gasket so as to preclude an outward expansion thereof, said pressure member including an inwardly directed flange for a seating of the lower end of the gasket thereagainst.

8. The device of claim 7 wherein the lower portion of